United States Patent [19]
Mori et al.

[11] Patent Number: 5,683,819
[45] Date of Patent: Nov. 4, 1997

[54] COMPOSITE OF HIGHLY SATURATED NITRILE RUBBER WITH FIBER, AND BELT COMPOSED THEREOF

[75] Inventors: Osamu Mori, Kamakura; Mitsugu Ishihara, Kawasaki; Motofumi Oyama, Yokosuka, all of Japan

[73] Assignee: Nippon Zeon Co., Ltd., Tokyo, Japan

[21] Appl. No.: 469,868

[22] Filed: Jun. 6, 1995

[30] Foreign Application Priority Data

Sep. 30, 1994 [JP] Japan ................... 6-261370

[51] Int. Cl.⁶ .................... C08L 33/18; C08L 33/20; C08L 33/22
[52] U.S. Cl. .................... 428/500; 525/165; 525/175; 525/178; 525/189; 525/233; 525/237; 525/238; 526/341; 526/342
[58] Field of Search .................... 525/189, 233, 525/237, 238, 165, 178, 175; 526/341, 342; 428/500

[56] References Cited

U.S. PATENT DOCUMENTS

| | | | |
|---|---|---|---|
| 4,643,938 | 2/1987 | Oyama et al. | 428/260 |
| 4,746,707 | 5/1988 | Fiedler et al. | 525/338 |
| 4,978,771 | 12/1990 | Fiedler et al. | 558/459 |
| 5,032,454 | 7/1991 | Oyama et al. | 428/392 |
| 5,159,010 | 10/1992 | Mori et al. | 524/510 |
| 5,164,457 | 11/1992 | Kubo et al. | 525/338 |
| 5,556,919 | 9/1996 | Oyama et al. | 525/189 |

FOREIGN PATENT DOCUMENTS

| | | |
|---|---|---|
| 0 381 457 | 8/1990 | European Pat. Off. . |
| 0 441 214 A2 | 8/1991 | European Pat. Off. . |
| 1045402 | 2/1989 | Japan . |
| 1045403 | 2/1989 | Japan . |
| 1045404 | 2/1989 | Japan . |
| 1045405 | 2/1989 | Japan . |

OTHER PUBLICATIONS

N. Asada et al., Compositions Distribution of Acrylonitrile-Butadiene . . .Rubber Chemistry and Technology, vol. 63, pp. 181–190.

*Primary Examiner*—W. Robinson H. Clark
*Attorney, Agent, or Firm*—Birch, Stewart, Kolasch, & Birch, LLP

[57] ABSTRACT

A composite comprised of a nitrile group-containing highly saturated copolymer rubber and a fibrous material, which copolymer rubber is a product obtained by hydrogenating the conjugated diene portion of an unsaturated nitrile-conjugated diene copolymer. The highly saturated copolymer rubber has an alkylthio group having 12 to 16 carbon atoms, which include at least three tertiary carbon atoms, and having a sulfur atom which is directly bound to at least one of the tertiary carbon atoms; and the copolymer rubber further has a Mooney viscosity of 15 to 200 and an iodine value not larger than 80. This composite is useful for a belt.

16 Claims, 2 Drawing Sheets

COMPOSITE OF HIGHLY SATURATED NITRILE RUBBER WITH FIBER, AND BELT COMPOSED THEREOF

BACKGROUND OF THE INVENTION

1. Field of the Invention

This invention relates to a composite of a highly saturated nitrile-conjugated diene copolymer rubber with a fibrous material. More specifically, it relates to a composite comprising a highly saturated nitrile-conjugated diene copolymer rubber, which is made by hydrogenating an unsaturated nitrile-conjugated diene copolymer containing an alkylthio group, and a fibrous material.

The composite of the invention is characterized as exhibiting good adhesion under vulcanizing conditions between the rubber and the fibrous material and having high bond strength and mechanical strength, and thus, the composite is useful especially for belts.

2. Description of the Related Art

A composite of a highly saturated nitrile rubber (a typical example of which is a hydrogenation product of an acrylonitrile-conjugated diene copolymer) with a fibrous material, which has been treated with a mixture of a resorcinol-formaldehyde resin with a rubber latex (said mixture is hereinafter abbreviated to "RFL"), generally has good heat resistance and resistance to repeated distortion, and therefore, it has heretofore been used for belts (Japanese Examined Patent Publication No. 2-43767 and Japanese Unexamined Patent Publication No. 1-207442).

Usually, a composite composed of a highly saturated nitrile rubber with a fibrous material is made by bonding under vulcanizing conditions a highly saturated nitrile rubber layer having incorporated therein sulfur or another vulcanizing agent, to a fibrous material which has been treated with an RFL. Since the highly saturated nitrile rubber contains a minor amount of unsaturated bonds, it often exhibits a poor adaptability for high-speed vulcanization and the bonding under vulcanization conditions is effected only to the least extent, and consequently, the bond strength and mechanical strength of the vulcanizate are poor.

SUMMARY OF THE INVENTION

In view of the foregoing, a primary object of the present invention is to provide a composite of a highly saturated nitrile rubber with a fibrous material, which is characterized as exhibiting excellent adaptability for bonding under vulcanizing conditions, especially effected with a sulfur vulcanizer, and having high bonding strength and mechanical strength, as well as good properties possessed by a highly saturated nitrile rubber, i.e., good oil resistance, heat resistance and weather resistance.

Another object of the present invention is to provide a belt having a high mechanical strength as well as good oil resistance, heat resistance and weather resistance.

In one aspect of the present invention, there is provided a composite comprising a nitrile group-containing highly saturated copolymer rubber and a fibrous material; said nitrile group-containing highly saturated copolymer rubber being a product obtained by hydrogenating the conjugated diene portion of an unsaturated nitrile-conjugated diene copolymer, and said highly saturated copolymer rubber having an alkylthio group having 12 to 16 carbon atoms, which include at least three tertiary carbon atoms, and having a sulfur atom which is directly bound to at least one of the tertiary carbon atoms; and said copolymer rubber further having a Mooney viscosity of 15 to 200 and an iodine value not larger than 80.

In another aspect of the present invention, there is provided a belt made of the above-mentioned composite composed of said nitrile group-containing highly saturated copolymer rubber and a fibrous material.

DESCRIPTION OF THE PREFERRED EMBODIMENTS

Nitrile Group-Containing Highly Saturated Copolymer Rubber

Figure 1:
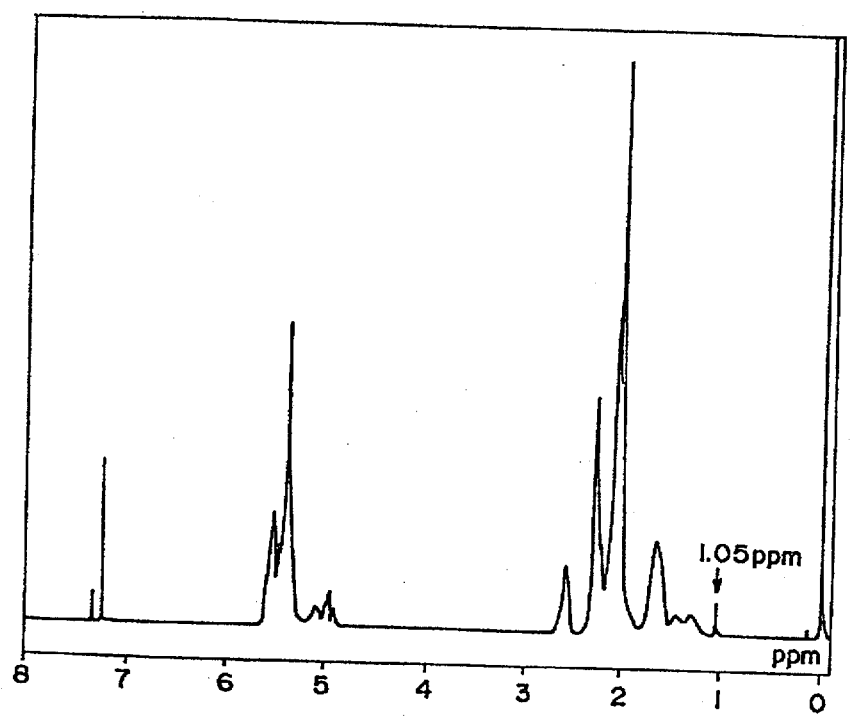
FIG. 1 is a chart of $^1$H-NMR determination of an unsaturated nitrile-conjugated diene copolymer I prepared in Example 1, hereinafter described.

The nitrile group-containing highly saturated copolymer rubber used in the present invention is a product obtained by hydrogenating the conjugated diene portion of an unsaturated nitrile-conjugated diene copolymer having an alkylthio group having 12 to 16 carbon atoms, which include at least three tertiary carbon atoms, and having a sulfur atom which is directly bound to at least one of the tertiary carbon atoms. The nitrile group-containing highly saturated copolymer rubber has a Mooney viscosity of 15 to 200, preferably 30 to 100 and an iodine value not larger than 80, preferably not larger than 40. If the Mooney viscosity of the highly saturated copolymer rubber is smaller than 15, a satisfactory bonding strength cannot be obtained and the strength of vulcanized product is not high. If the Mooney viscosity exceeds 200, molding characteristics become poor. There is no lower limit of the iodine value, but preferably the iodine value is at least 1 because, if the iodine value is too low, the vulcanization with sulfur becomes difficult.

The unsaturated nitrile-conjugated diene copolymer used for the preparation of the nitrile group-containing highly saturated copolymer rubber preferably contains 3 to 20% by weight of a fraction having a number average molecular weight (Mn) not larger than 35,000. If the fraction having an Mn not larger than 35,000 is too large, mechanical strength is reduced. Where the content of the fraction having an Mn not larger than 35,000 is 3 to 20% by weight, processability can be improved with the maintenance of high strength.

The ratio (Mw/Mn) of the weight average molecular weight (Mw) to the number average molecular weight (Mn) of the unsaturated nitrile-conjugated diene copolymer is usually in the range of 2.3 to 5.5, preferably 2.7 to 4. If the Mw/Mn ratio is too large, the processability is low even though the fraction of an Mn not larger than 35,000 is adequate.

The unsaturated nitrile-conjugated diene copolymer preferably contains 10 to 60% by weight of bound unsaturated nitrile units. More preferable content is 20 to 50% by weight. The breadth (ΔAn) of compositional distribution of the unsaturated nitrile is usually not larger than 35, preferably in the range of 3 to 20, more preferably 5 to 15. If the distribution breadth is too large, the balance between the oil resistance and the cold resistance is lost.

The unsaturated nitrile-conjugated diene copolymer is preferably substantially free from halogen. The term "substantially free from halogen" used herein means that the content of halogens in the copolymer is smaller than about 3 ppm. The copolymer substantially free from halogen is beneficial, for example, in that a problem of metal corrosion does not occur when the copolymer as an adhesive is placed in contact with a metal.

As specific examples of the unsaturated nitrile, there can be mentioned acrylonitrile, methacrylonitrile and –chloroacrylonitrile. As specific examples of the conjugated diene, there can be mentioned 1,3-butadiene, 2,3-dimethylbutadiene, isoprene and 1,3-pentadiene.

Provided that the object of the present invention is not injured, part of the unsaturated nitrile and the conjugated can be substituted by copolymerizable monomers. As specific examples of the copolymerizable monomer, there can be mentioned vinyl monomers such as styrene, α-methylstyrene and vinylpyridine; non-conjugated diene monomers such as vinylnorbornene, dicyclopentadiene and 1,4-hexadiene; alkyl acrylates and alkyl methacrylates having 1 to 18 carbon atoms in the alkyl group, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate; alkoxyalkyl acrylates having 2 to 12 carbon atoms in the alkoxyalkyl group, such as methoxymethyl acrylate, methoxyethyl acrylate, ethoxyethyl acrylate, butoxyethyl acrylate, ethoxypropyl acrylate, methoxyethoxyethyl acrylate and ethoxybutoxyethyl acrylate; cyanoalkyl acrylates having 2 to 12 carbon atoms in the cyanoalkyl group, such as α- and β-cyanoethyl acrylate, α-, β- and γ-cyanopropyl acrylate, cyanobutyl acrylate, cyanohexyl acrylate and cyanooctyl acrylate; hydroxyalkyl acrylates such as 2-hydroxyethyl acrylate and hydroxypropyl acrylate; monoalkyl and dialkyl esters of unsaturated dicarboxylic acids such as monoethyl maleate, dimethyl maleate, dimethyl fumarate, diethyl fumarate, di-n-butyl fumarate, di-2-ethylhexyl fumarate, dimethyl itaconate, di-n-butyl itaconate and di-2-ethylhexyl itaconate; substituted-alkyl esters of unsaturated carboxylic acids such as ethylaminomethyl acrylate, diethylaminoethyl acrylate, 3-(diethylamino)-2-hydroxypropyl acrylate and 2,3-bis(difluoroamino)propyl acrylate; fluoroalkyl acrylates and methacrylates such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluorooctyl methacrylate and hexadecafluorononyl methacrylate; fluoro-substituted benzyl acrylate and methacrylate such as fluorobenzyl acrylate, fluorobenzyl methacrylate and difluorobenzyl methacrylate; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- and p-trifluoromethyl-styrene, vinyl pentafluorobenzoate, difluoroethylene and tetrafluoroethylene; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate.

The amount of these copolymerizable monomers is not particularly limited, but is usually smaller than 80% by weight based on the total weight of monomers. Especially when high oil resistance and heat resistance are required, the amount of the copolymerizable monomer is not larger than 10% by weight.

Where an unsaturated carboxylic acid ester monomer or a combination thereof with a fluorine-containing vinyl monomer is copolymerized together with the unsaturated nitrile and the conjugated diene, cold resistance of the nitrile group-containing highly saturated copolymer rubber can be improved without deterioration of the ozone resistance and heat resistance. Especially unsaturated dicarboxylic acid dialkyl esters are preferable for this purpose. The amount of the unsaturated carboxylic acid ester or a combination thereof with a fluorine-containing vinyl monomer is 1 to 80% by weight, preferably 15 to 60% by weight, more preferably 20 to 40% by weight, based on the total weight of the monomers.

Of the unsaturated nitrile-conjugated diene copolymers used for the preparation of the nitrile group-containing highly saturated copolymer rubber, an acrylonitrile-butadiene copolymer (hereinafter abbreviated to "NBR") having a bound acrylonitrile content of 10 to 60% by weight, preferably 20 to 50% by weight, is advantageous. Commercially available acrylonitrile-butadiene copolymers having a wide variety of bound acrylonitrile contents can be used and the most adequate bound acrylonitrile content should be chosen depending upon the particular properties desired.

As the alkylthio group having 12 to 16 carbon atoms, which include at least three tertiary carbon atoms, and having a sulfur atom which is directly bound to at least one of the tertiary carbon atoms, there can be mentioned a 1,1-di(2,2-dimethylpropyl)-1-ethylthio group and a 1,1-di(2,2-dimethylpropyl)-1-(2,2,4,4-tetramethylpentyl)-1-ethylthio group. These alkylthio groups may be contained either alone or in combination in one molecule. Of these, a 1,1-di(2,2-dimethylpropyl)-1-ethylthio group is preferable.

The amount of the alkylthio group in the unsaturated nitrile-conjugated diene copolymer is usually at least 0.03 mole, preferably at least 0.07 mole, more preferably at least 0.09 mole, per 100 moles of the total monomer units in the copolymer. The upper limit of the alkylthio group content is usually 0.3 mole per 100 moles of the total monomer units in the copolymer. If the amount of the alkylthio group is too small, when the nitrile group-containing highly saturated copolymer rubber is vulcanized at a high temperature for a short time, e.g., at the step of injection molding, a high crosslinking efficiency cannot be obtained and thus the tensile stress and impact resilience cannot be improved. Namely the intended high rate of vulcanization cannot be effected. As an increase in the amount of of the alkylthio group, the scorch time ($T_5$) is markedly shortened and the contamination of a mold is mitigated, and thus, the productivity in injection molding is enhanced. Especially when the content of the alkylthio group is at least 0.09 mole, the crosslinking efficiency is markedly improved, and the maximum torque in a vulcanization curve as obtained by measurement using an oscillating disc rheometer is drastically increased.

The unsaturated nitrile-conjugated diene copolymer is produced by a process wherein an unsaturated nitrile monomer and a conjugated diene monomer are copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms.

The free radical initiator used is not particularly limited. As examples of the free radical initiator, there can be mentioned organic peroxides, redox polymerization initiators, azo compounds and persulfates. These polymerization initiators are usually used in an amount of 0.005 to 3 parts by weight per 100 parts by weight of the monomers. The polymerization temperature is preferably in the range of 0° to 100° C.

As specific examples of the alkylthiol compound used as a molecular weight modifier for the production of the unsaturated nitrile-conjugated diene copolymer, there can be mentioned 2,2', 4,6,6'-pentamethylheptane-4-thiol and 2,2', 4,6,6',8,8'-heptamethylnonane-4-thiol. Of these, 2,2',4,6,6'-pentamethylheptane-4-thiol is preferable. A nitrile group-containing highly saturated copolymer rubber made from the unsaturated nitrile-conjugated diene copolymer made by using this alkylthiol compound exhibits excellent efficiency in high-rate vulcanization.

The alkylthiol compound as a molecular weight modifier can be used either alone or in combination. If desired, the alkylthiol compound can be used in combination with another molecular weight modifier which is conventionally used in a radical polymerization. In this case, the alkylthiol compound should be used in an amount of at least 50% by weight, preferably at least 80% by weight, and more preferably at least 95% by weight, based on the total weight of the molecular weight modifiers.

As the molecular weight modifier which may be used in combination with the above-mentioned alkylthiol compound, there can be mentioned, for example, alkylthiol compounds such as 2,4,4-trimethylpentane-2-thiol, dodecane-12-thiol, 2,2,6,6-tetramethylheptane-4-methanethiol and 2,4,6-trimethylnonane-4-thiol; xanthogendisulfides such as dimethyl xanthogendisulfide, diethyl xanthogendisulfide and diisopropyl xanthogendisulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; and acrolein, methacrolein, allyl alcohol, 2-ethylhexyl thioglycolate, terpinolene, α-terpinene, γ-terpinene, dipentene, α-methyl-styrene dimer (which preferably contains at least 50% by weight of 2,4-diphenyl-4-methyl-1-pentene), 2,5-dihydro-furan, 3,6-dihydro-2H-pin, phthalan, 1,2-butadiene and 1,4-hexadiene.

The amount of the molecular weight modifier used for radical polymerization is usually 0.05 to 3 parts by weight, preferably 0.1 to 1 part by weight, based on 100 parts by weight of the monomer mixture for copolymerization. This amount is advantageous for desirably controlling the molecular weight of the copolymer.

By adding the molecular weight modifier in lots in the course of polymerization, a copolymer containing 3 to 20% by weight of a low-molecular weight fraction having a number average molecular weight (Mn) smaller than 35,000 can be obtained. This low-molecular weight copolymer has a good processability. In general, it is preferable that 10 to 95% by weight of the molecular weight modifier is incorporated in a monomer mixture before the commencement of polymerization and, when the conversion reaches 20 to 70%, the remainder is added to the polymerization mixture. The number of divided lots can be appropriately determined according to the need.

Instead of the addition of the molecular weight modifier in lots in the course of polymerization, two or more of polymers having different molecular weights can be mixed together, which are separately produced by using different amounts of the molecular weight modifier.

By using the above-mentioned alkylthiol molecular weight modifier, the conversion in radical polymerization can be enhanced to at least 75%, preferably at least 80%. Thus the nitrile rubber can be produced at a high productivity.

In a radical polymerization for the production of an unsaturated nitrile-conjugated diene copolymer, a branch-forming reaction or gelation generally becomes marked with an increase of the polymerization conversion. Where the resulting nitrile rubber is vulcanized, a high vulcanization efficiency cannot be obtained and the vulcanizate has poor physical properties such as tensile stress and impact resilience. t-Dodecyl mercaptan which is conventionally used as a molecular weight modifier in a radical polymerization for nitrile rubbers is a mixture of alkyl-thiol compound isomers having 9 to 16 carbon atoms. Where this mixture is used as a molecular weight modifier, the resulting nitrile rubbers are difficult to vulcanize at a high rate when they are subjected to a high-temperature and short-time vulcanization, for example, when injection-molded.

In contrast, in a process for the production of the unsaturated nitrile-conjugated diene copolymer using the above-mentioned alkylthiol molecular weight modifier, even when the polymerization conversion is high, e.g., 80% or higher, the resulting nitrile rubber can be vulcanized at a high rate, and thus, the maximum torque in a vulcanization curve as obtained by measurement using an oscillating disc rheometer is high.

The entire amount of the monomers can be charged at once in a reactor before the commencement of polymerization. Alternatively, 30 to 90% by weight of the monomers can be charged before the commencement of polymerization and, when the polymerization conversion reaches 20 to 70% by weight, the remainder monomers are added to a polymerization mixture. The nitrile rubber made by this divided monomer addition method is characterized as having good and balanced oil resistance and cold resistance.

The kind and amount of monomers added in lots can be appropriately varied depending upon the intended content of bound unsaturated nitrile and the breadth (ΔAN) of compositional distribution of unsaturated nitrile. For example, where a bound nitrile content of smaller than 37% is intended, part of the unsaturated nitrile is usually added to the reaction mixture during polymerization. Where a bound nitrile content of at least 37% is intended, part of the conjugated diene is usually added to the reaction mixture during polymerization. The number of monomer addition can be appropriately determined according to the need.

The procedure by which the polymerization is effected is not particularly limited, and an appropriate procedure can be chosen from bulk polymerization, solution polymerization, suspension polymerization and emulsion polymerization. Of these, emulsion polymerization is preferable.

Where the unsaturated nitrile-conjugated diene copolymer is produced by an emulsion polymerization procedure, if a carboxylic acid type emulsifier is used, a problem of mold contamination does not arise at a high-temperature short-time vulcanization such as injection molding.

The carboxylic acid type emulsifier used includes, for example, fatty acid soap and rosin soap. As specific examples of the carboxylic acid type emulsifier, there can be mentioned fatty acid soap such as a sodium salt or a potassium salt of long-chain aliphatic carboxylic acids having 12 to 18 carbon atoms, for example, lauric acid, myristic acid, palmitic acid, stearic acid, oleic acid and mixtures thereof; and rosin soap such as a sodium salt or a potassium salt of a disproportionated or hydrogenated product of natural rosin such as gum rosin, wood rosin or tall oil rosin. The natural rosin contains as main ingredients abietic acid, levopimaric acid, palustric acid, dehydroabietic acid, tetrahydroabietic acid and neoabietic acid. The amount of the emulsifier is not particularly limited, but is usually in the range of 0.05 to 10 parts by weight, preferably 0.5 to 3 parts by weight, per 100 parts by weight of the monomers.

The emulsion polymerization for the unsaturated nitrile-conjugated diene copolymer can be carried out by a conventional procedure, and when the predetermined conversion is reached, polymerization is terminated by adding a short-stopper such as hydroxylamine or sodium carbamate. Unreacted monomers are removed, for example, by heating or steam distillation, and then, a coagulant is added in an emulsion polymerization, and which include an inorganic coagulant, a high-polymer coagulant or a heat-sensitive coagulant.

However, it is preferable that a nonionic surface active agent is incorporated in the copolymer latex as prepared in the above-mentioned manner, and then, the copolymer latex is introduced in a coagulating bath having a metal salt dissolved therein, and is heated whereby the copolymer latex is coagulated. By adopting this coagulating method, crumbs which have appropriate size and porosity and are capable of being easily dried. Further, by the addition of a nonionic surface active agent, the amount of a metal salt for coagulation can be reduced.

As specific examples of the nonionic surface active agent incorporated in the copolymer latex in the above-mentioned coagulating method, there can be mentioned an adduct of an alkylene oxide with an alkylphenol-formaldehyde condensate (for example, an oxyethylene-oxypropylene co-addition product), a polyoxyethlene alkyl ether, a polyoxy-ethylene alkyl-aryl ether, a polyoxyethylene fatty acid ester, a poly-oxyethylene sorbitan fatty acid ester, poly-oxyethylene-oxypropylene block copolymer, an alkylsulfinyl alcohol and a fatty acid monoglyceride. These nonionic surface active agents can be used either alone or in combination.

Of these nonionic surface active agents, an oxy-ethylene-oxypropylene co-addition product of an alkylphenol-formaldehyde condensate is preferable. This co-addition product exhibits a good heat-sensitivegel effect. The co-addition product preferably has a cloud point of 10° to 100° C., more preferably 20° to 70° C. If the cloud point is too low, the handling property is not satisfactory. If the cloud point is too high, the heatsensitive gel effect becomes poor.

The amount of the nonionic surface active agent is preferably 0.01 to 5 parts by weight, more preferably 0.05 to 2 parts by weight, based on 100 parts by weight of the copolymer. When the amount is too small, the above-mentioned benefits cannot be obtained. Even when the amount exceeds 5% by weight, there is no substantial increase in the above-mentioned benefits.

As the metal salt to be incorporated in the coagulating bath, calcium chloride, sodium chloride and metal sulfates are usually used. Especially metal sulfates do not contain halogens and thus result in a nitrile group-containing highly saturated copolymer rubber which does not cause a problem of metal corrosion. As specific examples of the metal sulfates, there can be mentioned aluminum sulfate, magnesium sulfate and sodium sulfate. Of these, aluminum sulfate and magnesium sulfate are preferable.

The amount of the metal salt is preferably in the range of 0.5 to 50 parts by weight, more preferably 1 to 30 parts by weight, based on 100 parts by weight of the copolymer. If the amount of the metal is too small, coagulation is insufficient and undesirably large crumbs are formed. If the amount of the metal salt is too large, the rate of coagulation varies depending upon the particular metal salt and the crumbs have a poor porosity.

When the coagulating bath having the copolymer latex introduced therein is heated to the cloud point of the nonionic surface active agent or higher, the copolymer latex coagulates. The nonionic surface active agent used preferably has a cloud point of 10° to 100° C. If the cloud point is too low, cooling is required for keeping the latex-incorporated coagulating bath below the cloud point. If the cloud point is too high, the latex-incorporated coagulating bath must be heated to a high temperature for coagulation.

The coagulated copolymer is recovered, washed with water and dried to give an unsaturated nitrile-conjugated diene copolymer, followed by hydrogenation to produce the nitrile group-containing highly saturated copolymer rubber.

The method by which the unsaturated nitrile-conjugated diene copolymer rubber is hydrogenated is not particularly limited, and a conventional method using a catalyst can be adopted. As specific examples of the catalyst for hydrogenation, there can be mentioned palladium/silica and a palladium complex (Japanese Unexamined Patent Publication No. 3-252405), and rhodium compounds and ruthenium compounds (Japanese Unexamined Patent Publication No. 62-125858, 62-42937, 1-45402, 1-45403, 1-45404 and 1-45405). The amount of the catalyst is not particularly limited, but is usually in the range of 5 to 10,000 ppm based on the weight of the copolymer.

Fibrous Material

As the fibrous material used as a reinforcer for the nitrile group-containing highly saturated copolymer rubber to produce the composite of the present invention, there can be mentioned natural fibers such as cotton, regenerated fibers such as viscose rayon, synthetic fibers such as nylon fiber, polyester fiber, vinylon fiber and aramid fiber, and inorganic fibers such as steel fiber, glass fiber and carbon fiber. These fibers can be used either or in combination.

These fibers are used in the form of, for example, staple fiber, filament, cord, rope, and fabrics such as canvas and cord fabric. The kind and form of the fibrous material is determined depending upon the particular article or use of the rubber/fiber composite.

Prior to combination of the fibrous material with the nitrile group-containing highly saturated copolymer rubber, the fibrous material is treated with an adhesive as conventionally used. For example, where nylon or rayon is used as the fibrous material, it is treated with a mixture of a rubber latex with an aqueous solution of a resorcinol-formaldehyde precondensate (the precondensate and the mixture are hereinafter referred to as "RF" and "RFL", respectively). Where a polyester fiber or an aromatic polyamide fiber is used, it is usually pre-treated with an isocyanate, ethylene thiourea, epoxy compound or a mixture thereof, and then heat-treated and thereafter treated with RFL. A polyester fiber and an aromatic polyamide fiber have a poor adhesion to rubber and therefore the pre-treatment is necessary prior to the RFL treatment. Where a glass fiber is used, a pre-treatment with an epoxysilane or an amino-silane (for example, a silane coupling agent such as amino-propyltriethoxysilane) is usually carried out prior to the RFL treatment.

The rubber latex used for the preparation of RFL is not particularly limited, and includes, for example, an acrylonitrile-butadiene copolymer latex, an acrylonitrile-butadiene-methacrylic acid copolymer latex, an acrylonitrile-butadiene-acrylic acid copolymer latex, an acrylonitrile-butadiene-acrylic acid copolymer latex, and latexes obtained by hydrogenating the butadiene portion of these nitrile-containing copolymer latexes; and latexes of halogen-containing polymer rubbers such as an epichlorohydrin polymer, a copolymer of epichlorohydrin with another epoxide or oxetane, a chloroprene rubber, chlorosulfonated polyethylene, chlorinated polyethylene, a chlorine-containing acrylic rubber having crosslinks formed with a chlorine-containing crosslinking monomer, a brominated butyl rubber, polyvinylidene chloride; and latexes of halogenated polymers such as chlorinated or brominated diene rubbers such as a chlorinated or brominated acrylonitrile-butadiene copolymer rubber, a chlorinated or brominated styrene-butadiene rubber and a chlorinated or brominated poly-butadiene rubber, and chlorinated or brominated ethylene-propylene-diene monomer copolymer rubber. These latexes can be used either alone or in combination.

As the rubber latex for RFL, an aqueous emulsion of the above-mentioned nitrile group-containing highly saturated copolymer rubber is most preferable because the highest bond strength can be obtained between the RFL-treated fibrous material and a rubber formulation.

A copolymer latex as prepared by an emulsion polymerization can be used as it is. A solid copolymer as prepared by other polymerization procedures can be made into a latex by a conventional method which includes a phase reversal of emulsion.

The composition of RFL, i.e., a mixture of RF and a rubber latex, is not particularly limited, but preferably the ratio of the rubber latex to RF is in the range of 10/1 to 2/1 by weight of the solid contents. The ratio of resorcinol to formaldehyde in the RF also is not particularly limited, but is preferably in the range of 1/3 to 3/1, more preferably 1/2 to 1/1. As the RF solution, those which are conventionally used for adhesion under vulcanization conditions of a rubber formulation with a fibrous material can be used.

The method by which the fibrous material is treated with RFL is not particularly limited, but usually the fibrous material is dipped in an RFL solution and then the RFL-treated fibrous material is heat-treated. The heating conditions vary depending upon the particular kind of fibrous material. The heat-treatment is carried out under temperature and time conditions such that the RFL deposited on the fibrous material reacts to be interlocked with the rubber and the fibrous material. Usually the heat-treatment is carried out at a temperature of 140° to 210° C. for several minutes.

Depending upon the kind of the fibrous material, the fibrous material can be pre-treated with an isocyanate solution, an epoxy compound solution or a mixed solution thereof, followed by drying, prior to the dipping in the RFL solution. In this pre-treatment, the drying should preferably be conducted at a temperature lower than the heat-treating temperature in the succeeding step.

Preparation of Composite From Rubber and Fibrous Material

The RFL-treated fibrous material and a nitirle group-containing highly saturated copolymer rubber are adhered together with each other under vulcanization conditions. Namely, the fibrous material is mixed with or laminated with the nitrile group-containing highly saturated copolymer rubber, and then the mixture or laminate is placed under vulcanization conditions. Usually the vulcanization is carried out under a pressure of 0.5 to 10 MPa at a temperature of 130° to 200° C. for 1 to 120 minutes.

The nitrile group-containing highly saturated copolymer rubber is incorporated with additive ingredients which are conventionally used in a rubber industry, by an ordinary mixer, to form a rubber formulation. The kind and amount of the additive ingredients are not particularly limited, and should be determined depending upon the particular user of the resulting composite.

A sulfur-containing vulcanizer is incorporated in the rubber formulation of the nitrile group-containing highly saturated copolymer rubber. The rubber formulation having a sulfur-containing vulcanizer incorporated therein exhibits an excellent high-rate vulcanizability. As specific examples of the sulfur-containing vulcanizer, there can be mentioned sulfur such as powdered sulfur, flower of sulfur, precipitated sulfur, colloidal sulfur, surface-treated sulfur and insoluble sulfur, and sulfur-containing compounds such as sulfur chloride, sulfur dichloride, morphorine disulfide, an alkylphenol disulfide, N,N'-dithio-bis(hexa-hydro-2H-azepinon-2), sulfur-containing polysulfide and high-molecular weight polysulfide. Further, sulfur-containing vulcanization promoters such as tetramethyl-thiuram disulfide, selenium dimethyl dithiocarbamate and 2-(4'-morphorinodithio) benzothiazole are included.

In combination with the sulfur-containing vulcanizer, a vulcanization promoter can be used which includes, for example, zinc oxide or stearic acid; or a guanidine, aldehyde-amine, aidehyde-ammonia, thiazole, sulfenamide, thiourea or xanthate promoter.

The amount of the sulfur-containing vulcanizer is not particularly limited, but is usually in the range of 0.10 to 10 parts by weight, preferably 0.1 to 5 parts by weight, per 100 parts by weight of the unsaturated nitrile-conjugated diene copolymer. If the sulfur-containing vulcanizer is not contained or the content thereof is too small, the high-rate vulcanization cannot be effected at a high-temperature short-time vulcanization.

A vulcanizer other than the sulfur-containing vulcanizer such as an organic peroxide vulcanizer can be used in combination with the sulfur-containing vulcanizer. As the organic peroxide vulcanizer, there can be mentioned, for example, tert-butyl hydroperoxide, cumene hydroperoxide, di-tert-butyl peroxide, tert-butylcumyl peroxide, 2,5-dimethyl-tert-butyl peroxyhexane, 2,5-dimethyl-tert-butyl peroxyhexyne, 1,3-bis(tert-butyl peroxyisopropyl)benzene, p-chlorbenzoyl peroxide, tert-butyl peroxybenzoate, tert-butyl peroxyisopropylcarbonate and tert-butyl benzoate.

As other vulcanizers which can also be used in combination with the sulfur-containing vulcanizer, there can be mentioned polyfunctional compounds such as trimethylolpropane trimethacrylate, divinylbenzene, ethylene dimethacrylate and triallyl isocyanurate. Further, there can be mentioned a metallic soap/sulfuric vulcanizer, a triazine/dithiocarbamate vulcanizer, a polycarboxylic acid/onium salt vulcanizer, a polyamine vulcanizer such as hexamethylenediamine, triethylenetetramine, hexamethylenediamine carbamate, ethylenediamine carbamate or triethylenediamine, and an ammonium benzoate vulcanizer.

In the rubber formulation, auxiliaries which are conventionally used in rubber formulations can be incorporated according to the need. Such auxiliaries include, for example, reinforcing materials such as various types of carbon black, silica and talc, fillers such as calcium carbonate and clay, processing aids, processing oils including plasticizers, antioxidants, and antiozonants.

Especially when the unsaturated nitrile-conjugated diene copolymer contains units of an ethylenically unsaturated carboxylic acid monomer such as acrylic acid, an oxide of a metal of group II of the periodic table can be incorporated in the rubber formulation whereby a rubber/fiber composite having an excellent dynamic fatigue resistance can be obtained.

As examples of the ethylenically unsaturated carboxylic acid monomer used for the preparation of such an unsaturated nitrile-conjugated diene copolymer, there can be mentioned acrylic acid, methacrylic acid, itaconic acid, fumaric acid, maleic acid and monoesters of these dicarboxylic acids. The content of the ethylenically unsaturated carboxylic acid units is preferably in the range of 0.1 to 15% by weight based on the weight of the copolymer, in view of the strength and dynamic fatigue resistance. When the content is smaller than 0.1% by weight, the intended high fatigue resistance and strength cannot be obtained. When the content is too large, the water resistance is reduced.

As examples of oxides of a metal of group II of the periodic table, there can be mentioned magnesium oxide, zinc oxide, calcium oxide and strontium oxide. Of these, zinc oxide and magnesium oxide are preferable.

If desired, other rubbers can be incorporated in combination with the nitrile group-containing highly saturated copolymer rubber in the rubber formulation, which include, for example, an acrylic rubber, a fluororubber, a styrene-butadiene copolymer rubber, an ethylene-propylene-diene terpolymer rubber (EPDM), natural rubber and a polyisoprene rubber.

EXAMPLES

The invention will now be described specifically by the following examples. Parts and % in the following examples, comparative examples and reference examples are by weight unless otherwise specified.

Characteristics of copolymers, vulcanizable rubber compositions and rubber vulcanizates were determined as follows.

(1) Properties of Copolymers (i) Bound nitrile content (%) was determined by measuring the content of nitrogen in the copolymer by the Kjeldahl method according to JIS K6384, and calculating the bound nitrile content from the nitrogen content.

(ii) Mooney viscosity was measured at a temperature of 100° C. on about 40 g of the copolymer specimen according to JIS K6383.

(iii) Number average molecular weight (Mn) and weight average molecular weight (Mw) of an unsaturated nitrile-conjugated diene copolymer before hydrogenation in terms of those of standard polystyrene were measured by gel permeation chromatography using tetrahydrofuran as a solvent. The proportion (%) of the fraction having a number average molecular weight lower than 35,000 to the total weight of the copolymer was calculated as the ratio (%) of the area of said low-molecular-weight fraction to the entire area of the molecular weight distribution.

(iv) Breadth ($\Delta AN$) of the compositional distribution of unsaturated nitrile in the unsaturated nitrile-conjugated diene copolymer before hydrogenation was determined by a high-speed liquid chromatography. The method of determination is described in Rubber Chemistry and Technology, vol. 63, [2] p181–191 (1990). Namely, chromatogram was prepared by a high-speed chromatography under the following conditions. $\Delta AN$ was the half-value width of the chromatogram. For the determination of AN, a calibration chart showing the relationship of amount of eluate with the amount of unsaturated nitrile was prepared by using a copolymer sample containing a known amount of unsaturated nitrile.

1. Column
   Gel: crosslinked 2-chloroacrylonitrile/ethylene dimethacrylate copolymer
   Diameter of gel particles: 2 to 6 μm
   Column: made of stainless steel
   Column diameter×length: 0.46 cm×25 cm 2. Eluting solution
   At the initial chloroform/n-hexane ratio (30/70 by weight), the eluting solution was allowed to flow for 20 minutes and then, eluated from 30/70 to 100/0 in a gradient manner over a period of 30 minutes.

3. Rate of flow: 0.5 ml/min.

4. Concentration of sample: 1% by weight solution in chloroform

5. Injection amount: 10 to 20 μl

6. Detector: light scattering mass detector Model 750/14 made by ACS Co.

7. Instrument: Trirotor VI made by Nippon Bunko K. K.

(v) Concentration (% by mole) of a 1,1-di(2,2-dimethylpropyl)-1-ethylthio group in the unsaturated nitrile-conjugated diene copolymer before hydrogenation was determined as follows. The copolymer was dissolved in benzene, and then coagulated in methyl alcohol. This operation of dissolution and coagulation was repeated three times, and then the copolymer was purified. The purified copolymer was subjected to the measurement by NMR as follows.

By measurement using $^1$H-NMR (400 MHz), a peak due to a proton of the terminal methyl group in the 1,1-di(2,2-dimethylpropyl)-1-ethylthio group was detected in the vicinity of 1.05 ppm. By measurement using $^{13}$C-NMR (100 MHz), a peak due to the carbon atom of the methylene group in said ethylthio group was detected in the vicinity of 54.6 ppm.

The concentration (% by mole) of said ethylthio group in the copolymer was determined by calculation from the ratio (A/B) of (A) an integrated value of the peak due to the terminal methyl group as detected by the $^1$H-NMR measurement to (B) an integrated value of a peak detected in the vicinity of 4.8 to 5.8 ppm due to a proton bound to an unsaturation of butadiene.

(vi) Concentration (ppm) of residual chlorine in the unsaturated nitrile-conjugated diene copolymer was determined by a method wherein the copolymer was placed in a water-incorporated closed vessel, the water was heated to boil at 120° C. for 24 hours to extract a soluble fraction from the copolymer, the extract liquid was concentrated, and the concentration of chlorine was measured by the ion chromatography.

(2) Properties of Vulcanizable Rubber Compositions (i) High-rate vulcanizability
   Using 10 g of an unvulcanized rubber composition prepared according to the recipe shown in Table 1, the scorch time ($T_5$ in minute) and the maximum torque ($V_{max}$ in kgf·cm) at a temperature of 160° C. were determined by an oscillating disc rheometer according to the Society of Rubber Industrial Japan Standard SRIS 3102. The smaller the $T_5$ value, the higher the rate of vulcanization. The larger the $V_{max}$ value, the larger the crosslinking efficiency.

TABLE 1

| Ingredients | Amount (parts by weight) |
| --- | --- |
| Copolymer | 100 |
| Zinc oxide | 5 |
| Stearic acid | 1 |
| Sulfur (325 mesh) | 0.5 |
| SRF carbon black | 60 |
| Dioctyl phthalate | 5 |
| Tetramethylthiuram disulfide | 1.5 |
| N-cyclohexyl-2-benzothiazyl-sulfenamide | 1.5 |

(3) Properties of Rubber Vulcanizate (i) According to Japanese Industrial Standard (JIS) K6301, an unvulcanized rubber formulation prepared according to the recipe shown in Table 1 was vulcanized at a temperature of 160° C. for 20 minutes to give a sheet having a thickness of 2 mm. A #3 dumbbell specimen was cut out from the sheet.

Tensile strength (kgf/cm²), tensile stress at 100% elongation (kgf/cm²) and elongation at break (%) were measured on the dumbbell specimen. Hardness was measured by using a JIS spring-type A hardness tester. Compression set (%) was measured after the specimen was maintained at a temperature of 120° C. for 22 hours.

(ii) Oil resistance was evaluated according to JIS K6301 by the volume change (%) as measured after immersion of the specimen in a #3 lubricating oil having a kinetic viscosity of 31.9 to 34.1, an aniline point of 68.5° to 70.5° C. and a flash point of 162.7 at a temperature of 120° C. for 72 hours.

(iii) Cold resistance was evaluated according to JIS K6301 by a Gehman tortional test method, and expressed by the temperature ($T_{10}$ in °C.) at which the tortion angle reached 10 times of the tortion angle as measured at 23° C. The lower the $T_{10}$, the better the cold resistance.

(iv) Ozone resistance (weather resistance) was evaluated according to JIS K6301 by elongating 20% under static conditions at an ozone concentration of 80 ppm and a temperature of 40° C., allowing to stand for 12 hours, 24 hours, 48 hours and 72 hours, and thereafter observing the state of crack formation.

(v) Heat aging resistance was evaluated according to JIS K6301 by allowing to stand at a temperature of 120° C. for 72 hours and thereafter measuring the tensile strength, elongation at break and hardness, and expressed by the change of these properties.

Preparation of Sheet of Rubber Formulation

A reactor having an inner volume of 10 liters was charged with 2 parts of potassium oleate as an emulsifier, 0.1 part of potassium phosphate as a stabilizer and 150 parts of water, and further, butadiene, acrylonitrile and 2,2',4,6,6'-pentamethylheptane-4-thiol (hereinafter abbreviated to "PMHT") as a molecular weight modifier were added (the amounts of these ingredients are shown in Table 2). By incorporating 0.015 part of ferrous sulfate as an activator and 0.05 part of p-menthane hydroperoxide, an emulsion polymerization was commenced at a temperature of 10° C.

In the preparation of part of acrylonitrile-butadiene copolymers, when the conversion reached to a predetermined value shown in Table 2, acrylonitrile (preparation of copolymers I–IV), butadiene (preparation of copolymer V) and PMHT (preparation of copolymers I–V) were additionally incorporated in the reaction mixture. When the conversion reached a predetermined value shown in Table 2, 0.2 part of hydroxylamine sulfate per 100 parts of the monomers was added to terminate polymerization. Then the polymerization mixture was heated and subjected to a steam distillation at about 70° C. under a reduced pressure to recover residual monomers. As an aging stabilizer 2 parts of an alkylated phenol was added to obtain a copolymer latex.

To this copolymer latex, 0.25 part of an oxyethylene-oxypropylene adduct to an alkylphenol-formaldehyde condensate ("Latemul" NP-5150) as a nonionic surface active agent was added. Then the copolymer latex was incorporated dropwise into a 5 liter-volume coagulating vessel, equipped with a stirrer, having charged with an aqueous coagulating solution containing 3 parts of aluminum sulfate as a coagulating agent. The latex-incorporated coagulating solution was maintained at 50° C. to coagulate the copolymer. The thus-obtained crumbs were taken out, and washed with water and then dried at 50° C. under a reduced pressure to obtain an acrylonitrile-conjugated diene copolymer. The copolymer was dissolved in methyl isobutyl ketone and then hydrogenated by using a palladium/silica catalyst in a pressure vessel to obtain each of nitrile group-containing highly saturated copolymer rubbers I–V.

The polymerization conditions, bound acrylonitrile content, bound butadiene content and concentration of an alkylthio group in the copolymer before hydrogenation and Mooney viscosity and other characteristics of the copolymer after hydrogenation are shown in Table 2.

According to the recipe shown in Table 1, the highly saturated copolymer rubber was kneaded together by a Banbury mixer to obtain a rubber formulation. The rubber formulation was milled on rolls to obtain a rubber sheet having a thickness of about 2.5 mm. The rubber sheet was subjected to press vulcanization at 160° C. for 20 minutes, and the physical properties of the vulcanizate were evaluated. The results are shown in Table 3.

For comparison, butadiene and acrylonitrile were copolymerized by the same procedures as employed in Example 2, except that commercially available t-dodecyl mercaptan was used as a molecular weight modifier instead of PMHT, and butadiene, acrylonitrile and the molecular weight modifier were charged at a time before commencement of polymerization. The obtained copolymers were hydrogenated to obtain nitrile groupcontaining highly saturated copolymer rubbers VI–VIII. The copolymer rubbers were made into rubber sheets, followed by press vulcanization. The properties of the thus-obtained vulcanizates are shown in Table 3.

Figure 2:
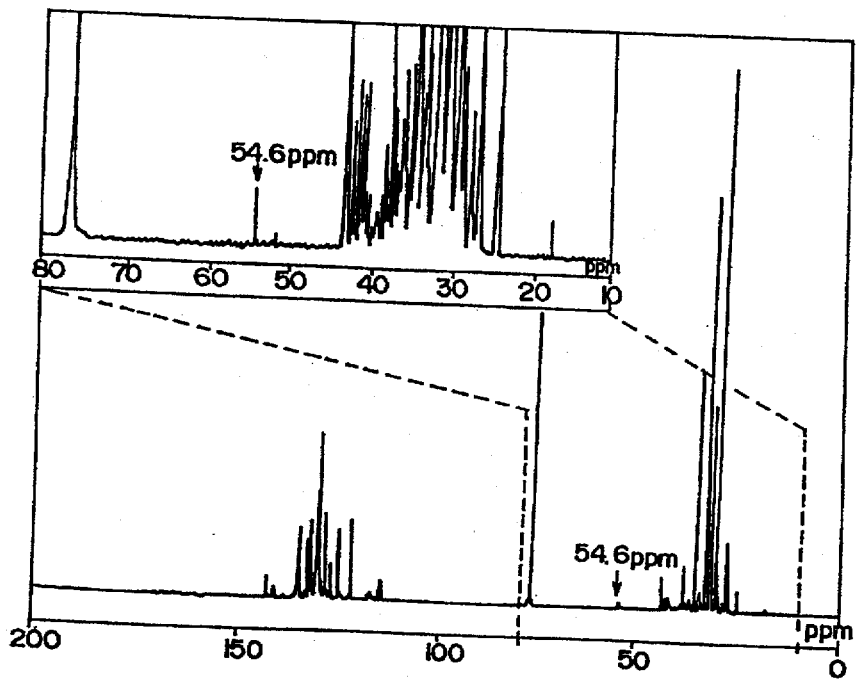
FIG. 2 is a chart of $^{13}$C-NMR determination of the unsaturated nitrile-conjugated diene copolymer I prepared in Example 1.
Figure 3:
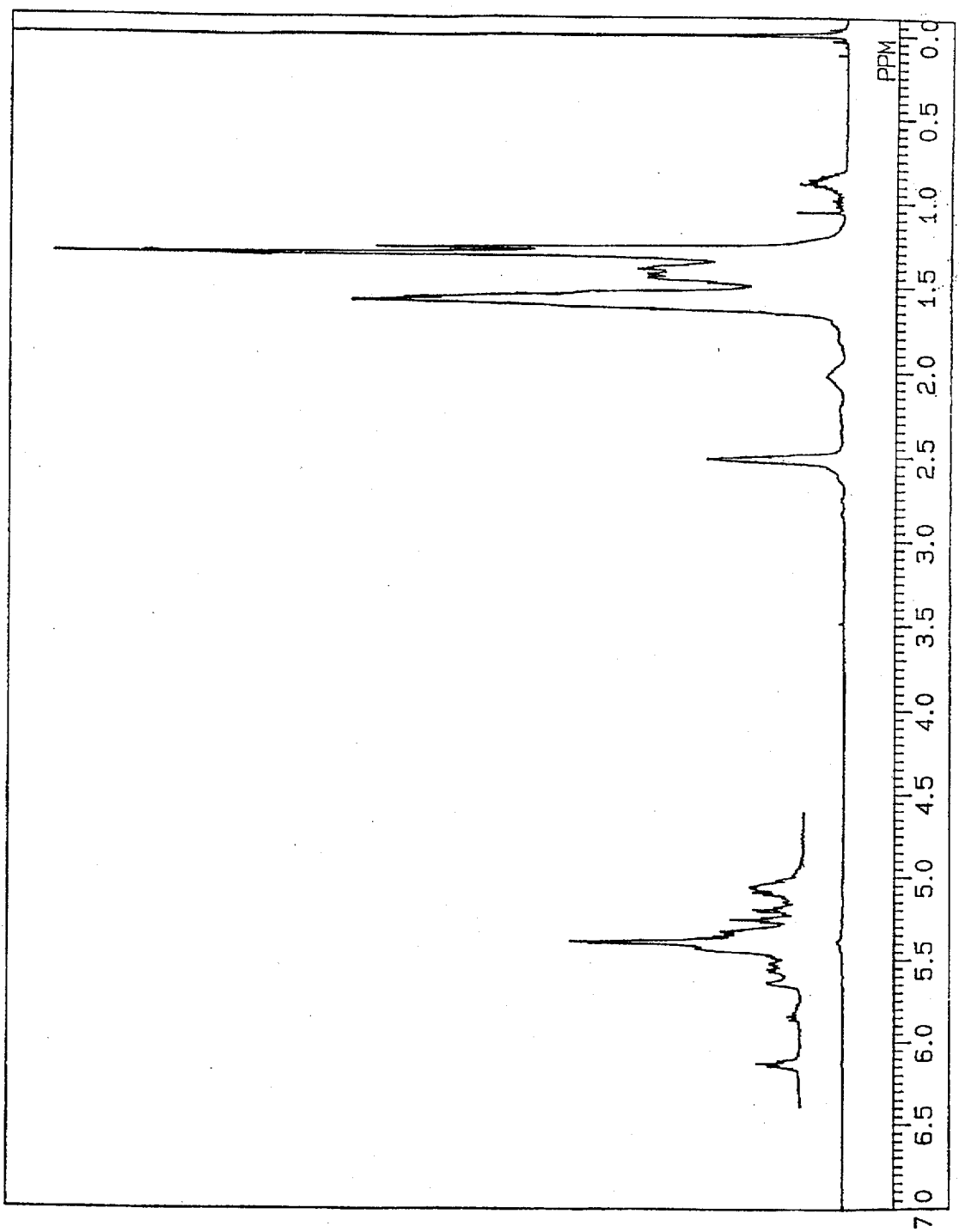
FIG. 3 is a chart of $^1$H-NMR determination of a nitrile group-containing highly saturated copolymer rubber obtained by hydrogenating the unsaturated nitrile-conjugated diene copolymer I prepared in Example 1.

A chart of $^1$H-NMR determination of the unsaturated nitrile-conjugated diene copolymer I is shown in FIG. 1, and a chart of $^{13}$C-NMR determination of the unsaturated nitrile-conjugated diene copolymer I is shown in FIG. 2. A chart of $^1$H-NMR determination of the hydrogenation product (i.e., the nitrile group-containing highly saturated copolymer rubber) of the unsaturated nitrile-conjugated diene copolymer I is shown in FIG. 3.

NMR determinations of the other unsaturated nitrile-conjugated diene copolymers II to V revealed that these copolymers also had a 1,1-di(2,2'-dimethylpropyl)-1-ethylthio group.

TABLE 2

| Hydrogenated copolymer | I | II | III | IV | V | VI | VII | VIII |
|---|---|---|---|---|---|---|---|---|
| Hydrogenated copolymer | | | | | | | | |
| Iodine value | 15 | 5 | 15 | 30 | 15 | 15 | 15 | 15 |
| Mooney viscosity | 72 | 86 | 81 | 73 | 78 | 68 | 78 | 76 |
| Copolymer before hydrogenation | | | | | | | | |
| Bound butadiene (%) | 66 | 56 | 56 | 56 | 50 | 66 | 56 | 50 |
| Bound acrylonitrile (%) | 34 | 44 | 44 | 44 | 50 | 34 | 44 | 50 |
| Concentration of alkylthio group (mole %) | 0.09 | 0.08 | 0.09 | 0.05 | 0.09 | — | — | — |
| ΔAN | 9 | 9 | 8 | 8 | 8 | 21 | 20 | 20 |
| Fraction of Mn ≦ 35,000 (%) | 12 | 13 | 12 | 12 | 13 | 3 | 3 | 3 |
| Conc. of residual Cl (ppm) | 0 | 0 | 0 | 0 | 0 | 0 | 0 | 0 |
| Polymerization conditions | | | | | | | | |
| Monomers | | | | | | | | |
| Butadiene | | | | | | | | |
| Amount charged (parts) | 71 | 40 | 40 | 40 | 20 | 67 | 50 | 40 |
| Amount added (parts) | — | — | — | — | 10[42] | — | — | — |
| [Conversion on addition] (%) | | | | | 10[60] | | | |
| Acrylonitrile | | | | | | | | |
| Amount charged (parts) | 22 | 5 | 5 | 5 | 60 | 33 | 50 | 60 |
| Amount added (parts) | 4[35] | 9[60] | 9[60] | 9[60] | — | — | — | — |
| [Conversion on addition] (%) | 3[55] | | | | | | | |
| Mw modifier | | | | | | | | |
| PMHT | | | | | | | | |
| Amount charged (parts) | 0.28 | 0.28 | 0.28 | 0.28 | 0.28 | — | — | — |
| Amount added (parts) | 0.17 | 0.17 | 0.17 | 0.17 | 0.17 | — | — | — |
| [Conversion on addition] (%) | [50] | [50] | [50] | [50] | [50] | — | — | — |
| TDM | | | | | | | | |
| Amount charged (parts) | — | — | — | — | — | 0.45 | 0.45 | 0.45 |
| Polymerization time (hr) | 13 | 13 | 13 | 13 | 14 | 13 | 15 | 15 |
| Conversion on termination (%) | 75 | 80 | 80 | 80 | 75 | 80 | 90 | 85 |

Molecular weight modifier: PMHT = 2,2',4,6,6'-Pentamethylheptane-4-thiol
TDM = tert-Dodecylmercaptan

TABLE 3

| Hydrogenated copolymer | I | II | III | IV | V | VI | VII | VIII |
|---|---|---|---|---|---|---|---|---|
| High-speed vulcanizability | | | | | | | | |
| Scorch time $T_s$ (min) | 3.0 | 3.2 | 3.0 | 2.7 | 2.9 | 4.0 | 4.2 | 4.1 |
| Maximum torque $V_{max}$ (kgf · cm$^2$) | 68 | 65 | 70 | 74 | 72 | 58 | 60 | 60 |
| Physical properties in ordinary state | | | | | | | | |
| Tensile strength (kgf/cm$^2$) | 230 | 240 | 252 | 244 | 260 | 210 | 228 | 238 |
| Elongation at break (%) | 520 | 600 | 500 | 420 | 510 | 600 | 620 | 630 |
| Tensile stress at 100% elongation (kgf/cm$^2$) | 38 | 32 | 39 | 45 | 38 | 30 | 31 | 31 |
| Hardness (JIS) | 72 | 72 | 74 | 76 | 75 | 70 | 72 | 73 |
| Compression set (%) | 36 | 48 | 35 | 30 | 38 | 60 | 63 | 60 |
| Oil resistance (volume change) (%) | +20 | +12 | +10 | +9 | +7 | +23 | +12 | +8 |
| Cold resistance (Gehman $T_{10}$) (°C.) | −26 | −22 | −22 | −22 | −15 | −24 | −20 | −12 |
| Heat aging resistance | | | | | | | | |
| Change of tensile stress | +2 | +0 | −1 | +2 | −1 | +3 | +2 | −2 |
| Change of elongation | −22 | −18 | −25 | −30 | −27 | −25 | −27 | −28 |
| Change of hardness | +3 | +3 | +3 | +4 | +4 | +3 | +3 | +4 |
| **Ozone resistance *[1]** | | | | | | | | |
| 12 hr | NC | NC | NC | NC | NC | NC | NC | NC |
| 24 hr | NC | NC | NC | NC | NC | NC | NC | NC |

TABLE 3-continued

| Hydrogenated copolymer | I | II | III | IV | V | VI | VII | VIII |
| --- | --- | --- | --- | --- | --- | --- | --- | --- |
| 48 hr | NC | NC | NC | NC | NC | NC | NC | NC |
| 72 hr | NC | NC | NC | NC | NC | NC | NC | NC |

*[1]NC: Crack formation was not observed

As seen from Table 3, the vulcanizable rubber composition comprising each of the nitrile group-containing highly saturated copolymer rubbers I to V and a sulfur-containing vulcanizer exhibits a short scorch time ($T_5$) and an increased maximum torque ($V_{max}$), as measured by using an oscillating disc rheometer. Thus the rubber composition has an excellent high-rate vulcanizability. This leads to a vulcanizate having a high tensile stress at 100% elongation, a high strength, a high hardness and a reduced compression set. Thus the vulcanization efficiency is high. The heat aging resistance also is good and therefore the heat resistance is satisfactory.

Copolymers I to V were prepared by adding acrylonitrile or butadiene in lots during polymerization, and therefore, these copolymers exhibited a low ΔAN, a small $T_{10}$ as measured by the Gehman tortional test and a reduced change in volume after immersion in an oil, as compared with copolymers VI to VIII prepared by charging the monomers at once. Namely copolymers I to V have good and balanced oil resistance and cold resistance while keeping a high mechanical strength.

In contrast, copolymers VI to VIII, which were prepared by using t-dodecyl mercaptan, i.e., a conventional and commercially available molecular weight modifier widely used in radical polymerization, exhibit a poor high-rate vulcanizability, a low mechanical strength and a large compression set. NMR determination of these copolymers VI to VIII revealed that a 1,1-di(2,2-dimethylpropyl)-1-ethylthio group was not present in these copolymers.

Preparation of RFL Solution

Each copolymer latex before hydrogenation used for the preparation of the rubber formulation sheet was diluted to a concentration of 12% by weight. A 1-liter volume autoclave equipped with a stirrer was charged with 400 ml of the diluted copolymer latex. The inside of the autoclave was flushed with nitrogen for 10 minutes to remove oxygen dissolved in the latex. Palladium acetate as a hydrogenation catalyst dissolved in 240 ml of acetone was incorporated in the copolymer latex. The inner atmosphere of the autoclave was substituted by hydrogen gas twice and then hydrogen gas was blown therein to a pressure of 30 atmospheric pressure. The content was then heated to 50° C. and stirred for 6 hours to conduct a reaction. The content was cooled to room temperature, excess of hydrogen was purged, and the organic solvent was removed therefrom by using an evaporator and simultaneously the content was concentrated to a solid content of about 40% whereby latexes of nitrile group-containing highly saturated copolymer rubber I to VIII shown in Table 4 were obtained. Average particle diameters and iodine values of these copolymer rubbers and pH values of these latexes are shown in Table 4.

TABLE 4

| Hydrogenated Copolymers | I | II | III | IV | V | VI | VII | VIII |
| --- | --- | --- | --- | --- | --- | --- | --- | --- |
| Iodine value | 16 | 5 | 17 | 30 | 15 | 16 | 15 | 15 |
| Average particle diameter (μm) | 0.10 | 0.10 | 0.11 | 0.10 | 0.10 | 0.11 | 0.09 | 0.10 |
| Solid content (%) | 40.0 | 39.9 | 40.1 | 40.0 | 41.0 | 40.5 | 40.3 | 40.2 |
| pH | 10.6 | 10.5 | 10.6 | 10.7 | 10.7 | 10.5 | 10.6 | 10.5 |

Using each of the latexes shown in Table 4, an adhesive composition was prepared according to the recipe shown in Table 5.

TABLE 5

| RF liquid | |
| --- | --- |
| Resorcinol | 11.0 parts |
| Formalin (37%) | 16.2 |
| Aqueous sodium hydroxide (10%) | 3.0 |
| Water | 235.8 |
| Total | 266.0 |
| RFL liquid | |
| Latex | 250.0 parts |
| RF liquid | 266.0 |
| Aqueous ammonia (14%) | 22.6 |
| Water | 47.9 |
| Total | 586.5 |

Examples 1–5, Comparative Examples 1–3

Using each of the adhesive compositions, each of the following cords was subjected to a dipping treatment by a test single-cord dipping machine to prepare a treated cord. The cords used and the methods for the dipping treatment were as follows.

Nylon cords (6-nylon, 1,260 deniers/2) and rayon cords (3-super, 1,650 deniers/2) were treated with the RFL mixed liquid to obtain high-tensile cords.

Polyester fiber cords (polyethylene terephthalate, 1,500 deniers/3) were treated with a mixed liquid composed of 600 parts of the above-mentioned RFL liquid and 400 parts of a 2,6-bis(2,4-dihydroxyphenylmethyl-4-chlorophenol composition, heat-treated at 245° C. for 1 minute, dipped in the RFL liquid, and then heat-treated at 230° C. for 1 minute to obtain high-tensile cords.

Aramid fiber cords (Kevlar, 1,500 deniers/2, 127 T/m) were pre-treated with the following pre-treating liquid, heat-treated at 220° C., dipped in the RFL liquid, and then heat-treated at 230° C. to obtain high-tensile cords.

| Composition of Pretreating Liquid | |
| --- | --- |
| Diglycidyl ether of glycerin | 2.22 parts |
| Aqueous sodium hydroxide (10%) | 0.28 |
| 5% "AEROSOL" TO (solid content 75%)*1 | 0.56 |
| Water | 96.94 |
| Total | 100.00 |

*supplied by Nippon Aerosil Co.

Glass fiber cords (ECG 150, 3/10, 20 S) were dipped in an aqueous dispersion containing 5% of -aminopropyltriethoxysilane, heat-treated at 150° C. for 3 minutes, dipped in the RFL liquid and then heat-treated at 200° C. for 1 minute to obtain high-tensile cords.

Each treated cord was embedded, in an adherend rubber composition at an embedded length of 8 mm, and a press-vulcanization was conducted at a press pressure of 5 MPa and a temperature of 150° C. for 30 minutes to obtain a fiber/rubber composite.

A cord-drawing test was conducted on the fiber/rubber composite to determine the initial adhesion strength. Further, a cord-drawing test was conducted after the fiber/rubber composite was heat-treated at 120° C. for 168 hours in an air oven, to determine a hot-air aging adhesion strength. The results are shown in Table 6.

As seen from Table 6, the composite of the invention comprising the nitrile group-containing highly saturated copolymer rubber and a fibrous material exhibits an enhanced adhesion strength as compared with a composite comprising a conventional nitrile rubber-containing highly saturated copolymer rubber and a fibrous material.

What is claimed is:

1. A composite comprising a nitrile group-containing highly saturated copolymer rubber and a fibrous material; said nitrile group-containing highly saturated copolymer rubber being a product obtained by hydrogenating the conjugated diene portion of an unsaturated nitrile-conjugated diene copolymer; said highly saturated copolymer rubber having an alkylthio group having 12 to 16 carbon atoms, which include at least three tertiary carbon atoms, and having a sulfur atom which is directly bound to at least one of the tertiary carbon atoms; and said highly saturated copolymer rubber further having a Mooney viscosity of 15 to 200 and an iodine value not larger than 80.

2. A composite as claimed in claim 1, wherein said nitrile group-containing highly saturated copolymer rubber has at least 0.03 mole, per 100 moles of the monomeric units constituting the molecule, of said alkylthio group.

3. A composite as claimed in claim 1, wherein said nitrile group-containing highly saturated copolymer rubber has 0.07 to 0.3 mole, per 100 moles of the monomeric units constituting the molecule, of said alkylthio group.

4. A composite as claimed in claim 1, wherein said alkylthio group is at least one member selected from 1,1-di(2,2-dimethylpropyl)-1-ethylthio group and a 1-(2,2-dimethylpropyl)-1-(2,2,4,4-tetramethylpentyl)-1-ethylthio group.

5. A composite as claimed in claim 1, wherein said alkylthio group is 1,1-di(2,2-dimethylpropyl)-1-ethylthio group.

6. A composite as claimed in claim 1, wherein said unsaturated nitrile-conjugated diene copolymer is comprised of 10 to 60% by weight of acrylonitrile units, 90 to 40% by weight of butadiene units and 0 to 80% by weight of copolymerizable monomer units, and said nitrile group-

TABLE 6

| | Examples | | | | | Comparative Examples | | |
| --- | --- | --- | --- | --- | --- | --- | --- | --- |
| | 1 | 2 | 3 | 4 | 5 | 1 | 2 | 3 |
| Hydrogenated copolymer in adherend rubber formulation | I | II | III | IV | V | VU | VII | VIII |
| Iodine value/AN content | 15/34 | 5/44 | 15/44 | 30/44 | 15/50 | 15/34 | 15/44 | 15/50 |
| Hydrogenated copolymer in RFL liquid | I | II | III | IV | V | VI | VII | VIII |
| Fiber (initial adhesion after 120° C. × 168 hr heat-treatment/initial adhesion at room temperature) | | | | | | | | |
| Rayon | 20.0/20.0 | 21.5/21.5 | 22.0/22.5 | 22.0/22.0 | 21.0/21.5 | 17.5/18.0 | 17.0/17.5 | 17.0/17.0 |
| Nylon | 22.0/22.5 | 22.0/22.5 | 22.5/23.0 | 22.0/22.5 | 22.0/22.5 | 18.5/19.0 | 18.0/18.5 | 17.0/17.5 |
| Polyester fiber | 20.0/20.5 | 20.5/21.0 | 21.5/22.0 | 21.0/21.5 | 20.5/21.0 | 17.0/17.5 | 17.0/17.5 | 17.5/17.5 |
| Aramid fiber | 26.5/27.0 | 27.0/27.5 | 26.0/26.5 | 25.5/26.0 | 25.5/26.0 | 22.0/22.5 | 22.0/22.5 | 21.0/21.5 |
| Glass fiber | 22.0/22.5 | 23.0/23.5 | 22.5/23.0 | 22.5/23.0 | 22.0/22.5 | 19.0/19.5 | 18.0/18.5 | 17.0/17.5 |

The composite of the present invention comprising the above-specified nitrile group-containing copolymer rubber and a fibrous material exhibits, as compared with a composite comprising a conventional nitrile group-containing copolymer rubber and a fibrous material, an excellent high-rate vulcanizability, a good bond strength, a good mechanical strength, good and balanced oil resistance and heat resistance and a good weather resistance (i.e., ozone resistance).

The composite of the present invention is especially useful for belts, which are used under conditions such that flexural distortion repeatedly occurs in hot air or hot oil, and which include, for example, power transmitting belts such as a timing belt, and conveyor belts.

containing highly saturated copolymer rubber has a Mooney viscosity of 20 to 90.

7. A composite as claimed in claim 1, wherein said unsaturated nitrile-conjugated diene copolymer contains 3 to 20% by weight of a fraction having a number average molecular weight (Mn) of not larger than 35,000.

8. A composite as claimed in claim 1, wherein the ratio (Mw/Mn) of the weight average molecular weight (Mw) to the number average molecular weight (Mn) of said unsaturated nitrile-conjugated diene copolymer is in the range of 2.3 to 5.5.

9. A composite as claimed in claim 1, wherein the breadth (ΔAN) of compositional distribution of unsaturated nitrile in said unsaturated nitrile-conjugated diene copolymer is not larger than 35.

10. A composite as claimed in claim 1, wherein the breadth (ΔAN) of compositional distribution of unsaturated nitrile in said unsaturated nitrile-conjugated diene copolymer is in the range of 3 to 20.

11. A composite as claimed in claim 1, wherein said unsaturated nitrile-conjugated diene copolymer does not contain a halogen or contains smaller than 3 ppm of halogens.

12. A composite as claimed in claim 1, wherein said unsaturated nitrile-conjugated diene copolymer is comprised, based on the weight of the total monomer units, of 10 to 60% by weight of unsaturated nitrile units, 90 to 40% by weight of conjugated diene units and 1 to 80% by weight of units of an unsaturated carboxylic acid ester or a combination of an unsaturated carboxylic acid ester with a fluorine-containing vinyl monomer.

13. A composite as claimed in claim 1, wherein said nitrile group-containing highly saturated copolymer rubber is vulcanized with a sulfur-containing vulcanizer.

14. A composite as claimed in claim 1, wherein said fibrous material has been treated with an RFL solution comprising an aqueous latex of a nitrile group-containing highly saturated copolymer rubber and a resorcinol-formaldehyde resin.

15. A composite as claimed in claim 1, wherein said nitrile group-containing highly saturated copolymer rubber contained in the RFL solution has substantially the same composition as the nitrile group-containing highly saturated copolymer rubber as adherend combined with the fibrous material for the constitution of the composite.

16. A composite as claimed in claim 1, wherein said unsaturated nitrile-conjugated diene copolymer has 0.1 to 15% by weight, based on the weight of the total monomer units, of units of an ethylenically unsaturated carboxylic acid; and said nitrile group-containing highly saturated copolymer rubber as adherend has 0.5 to 30% by weight, based on the weight of the copolymer rubber, of an oxide of a metal of group II of the periodic table.

* * * * *